(No Model.)
A. B. CASE.
RATCHET AND PAWL DEVICE.
No. 373,812. Patented Nov. 29, 1887.
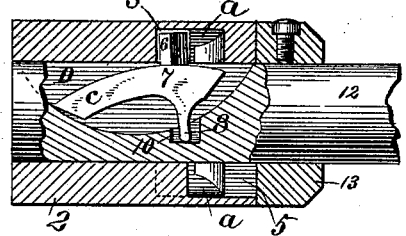
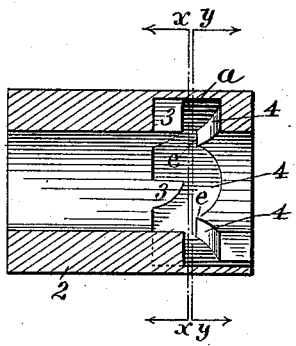
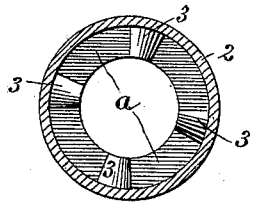
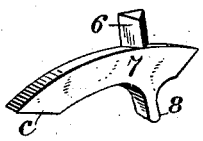
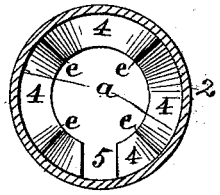
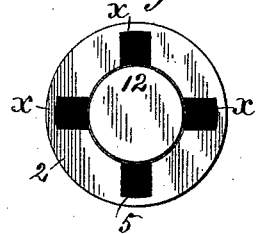
Witnesses
J. O. Saufield
G. M. Chamberlain.
Inventor
Adelbert B Case
By his Attorneys
Chapins

UNITED STATES PATENT OFFICE.

ADELBERT B. CASE, OF SPRINGFIELD, MASSACHUSETTS.

RATCHET-AND-PAWL DEVICE.

SPECIFICATION forming part of Letters Patent No. 373,812, dated November 29, 1887.

Application filed September 2, 1887. Serial No. 248,581. (No model.)

*To all whom it may concern:*

Be it known that I, ADELBERT B. CASE, a citizen of the United States, residing at Springfield, in the county of Hampden and State of Massachusetts, have invented new and useful Improvements in Ratchet-and-Pawl Devices, of which the following is a specification.

This invention relates to ratchet-and-pawl devices, the object being to provide an improved construction of said devices adapted particularly to be used in that portion of a shaft which rotates within the hub of a wheel or gear; and the invention consists in the peculiar construction and adaptation of the pawl to the shaft, in connection with one of said hubs having an annular groove therein provided with ratchet-teeth only on one side thereof, all as hereinafter fully described, and pointed out in the claim.

In the drawings forming part of this specification, Figure 1 is a longitudinal section of a wheel-hub, one end of a shaft passing through said hub and having its side partly broken away, and a pawl shown in operative relation to said hub and shaft, said figure showing in section a collar on said shaft against the end of said hub. Fig. 2 is a longitudinal section of the wheel-hub. Figs. 3 and 4 are transverse sections of the hub shown in Fig. 2, said sections being taken, respectively, on lines $x$ and $y$, Fig. 2. Fig. 5 is a perspective view of the pawl. Fig. 6 is an end view of said hub and of the shaft therein, illustrating a slightly-modified construction of the end of the hub, all as hereinafter fully described.

In the drawings, 2 indicates the hub of a gear or of any other wheel to which it may be desirable to attach ratchet-and-pawl connections. The said hub is cast on a suitable core, whereby an annular groove, $a$, is formed around the longitudinal shaft-passage through it, said annular groove having formed on one side thereof by casting, as aforesaid, a series of ratchet-teeth, 3, and the opposite side of said groove is given a sinuous form by making therein a series of curved recesses, 4, the latter occupying positions opposite the ends of said ratchet-teeth on the opposite side of said annular groove. As shown in Figs. 1 and 4, a slot, 5, is cut from said annular groove $a$ to the end of the hub; or, as shown in Fig. 6, a series of such grooves are cut from the annular groove $a$ to the end of the hub, as may be preferred, the additional grooves in said figure being indicated by $x$, the purpose thereof being fully described below.

The shaft 12, which is fitted to run in the hub 2, is prepared for the reception of the pawl, hereinafter described, by cutting or milling therein a longitudinal slot, D, (see Fig. 1,) and at the base of said slot is formed a fulcrum-socket, 10. A collar, 13, is attached to said shaft 12 by a suitable set-screw, as shown, whereby the hub and the shaft are retained in proper operative positions.

The pawl, which is adapted to operate in conjunction with the above-described hub and shaft, is illustrated in perspective view in Fig. 5 and in side elevation in Fig. 1. Said pawl 7 has a body of segmental form, as shown, having thereon projecting from its curved side the tooth 6, which in practice engages with the said ratchet-teeth 3 on one side of the annular groove $a$ in the hub, and on the opposite side of said pawl is formed the fulcrum bearing-point 8. It will be observed that said tooth 6 and the fulcrum-point 8 of the pawl are both located near one end of the body thereof, so that when the pawl is resting on said fulcrum-point in the position shown in Fig. 1 the end $c$ of the pawl swings against the base of the groove D, thereby bringing the tooth 6 of the pawl opposite the face of one of the ratchet-teeth 3 in the hub 2.

The position in which the pawl is shown in Fig. 1 is that which it occupies in the groove D of the shaft 12 when the pawl is in engagement with one of the teeth of the hub, whereby the latter is given a rotary motion when the shaft is turned, or the latter may be turned by rotating the hub. When the motion of shaft 12 is reversed, carrying the pawl backward, so that the tooth 6 is carried away from the face of the tooth 3 of the ratchet with which it has been engaged, one of its beveled sides strikes the curved side of the next adjoining tooth, thereby causing the pawl to oscillate on its fulcrum-bearing 8, (the latter resting in said socket 10 in the base of the groove D,) whereby the tooth 6 is made to swing into one of said curved recesses 4, and as the pawl is carried around still farther by the shaft 12 its tooth 6 next encounters one of the projections $e$, (see Fig. 4,) which, together with the overhanging end $c$ of the pawl, causes the latter to be thrown toward the toothed side of the annular groove in the hub, and so during a continuous rotation of the shaft 12 backward the pawl is given an oscillating motion; but instantly that the rotary motion of the shaft 12 is reversed the tooth of the pawl is found in position to engage with one of the teeth 3 of the hub, whereby the latter is rotated with the shaft.

The above-described construction of the hub 2, having the annular groove $a$ surrounding its inner wall, having on one side of said groove a series of ratchet-teeth, and having in its opposite side the curved recesses 4, whereby said side is given a sinuous form, as aforesaid, in conjunction with the peculiarly-constructed pawl 7, held and rotated by the shaft 12, as described, all provide ratchet-and-pawl devices which have a comparatively noiseless motion, and which operate with a minimum amount of frictional resistance, and hence they possess great durability and strength.

The above-referred-to slot 5, leading from the groove $a$ to the end of the hub, is provided to permit the tooth 6, which projects from the surface of the shaft when placed in the groove D, to enter the hub with the end of the shaft when the parts are assembled together in operative position, and consequently to withdraw the shaft and pawl from the hub. The additional grooves, $x$, in the end of the hub, identical with said groove 5, are provided to afford additional convenience for withdrawing the shaft and pawl from the hub.

By reference to Fig. 1 it is seen that the groove D in the shaft in which the pawl operates is not cut through the end of the shaft, and therefore there is no opening at that end through which dust can enter the hub and hinder the proper operation of the pawl, and the collar 13 closes the opening or openings of the slot or slots at the opposite end of the hub, so that the operative parts of the ratchet and pawl are completely shut in and protected from dirt, whereby their durability is greatly increased. The overhanging end $c$ of the pawl, extending laterally to one side of the fulcrum-point 8, as it does, acts to cause the tooth 6 to more positively engage fully with the ratchet-teeth than when the fulcrum is central between the ends of the pawl.

What I claim as my invention is—

A ratchet-and-pawl device consisting of a shaft having a longitudinal groove therein and a socket, 10, in the base thereof, and the pawl 7, located in said groove and capable of an oscillating motion therein, having the tooth 6 and the fulcrum-point 8 near one end thereof, said fulcrum-point engaging in said socket, combined with the hub 2, having the annular groove $a$, having on one side thereof the ratchet-teeth 3, with which said tooth 6 engages, and on its opposite side a series of curved recesses, 4, whereby it is given a sinuous form, substantially as set forth.

ADELBERT B. CASE.

Witnesses:
G. M. CHAMBERLAIN,
H. A. CHAPIN.